6687X
J. Reed,
Pump Lift,
Patented Aug. 5, 1831.
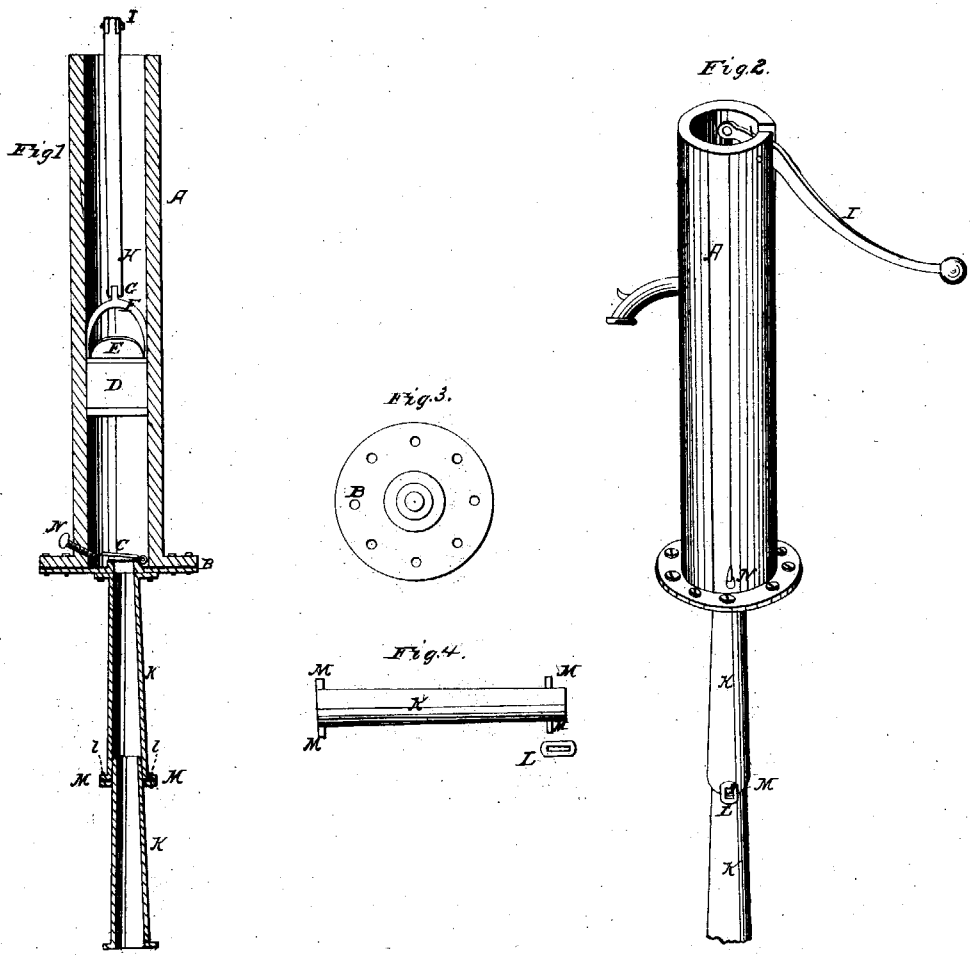
M. PETERS, PHOTO-LITHOGRAPHER, WASHINGTON, D. C.

[illegible] August 5th [illegible] [illegible]

X6687 Jesse Reed.

Letters Patent. August 5th [illegible]

The schedule referred to in these Letters Patent, and making part of the same, containing a description in the words of the said Jesse Reed himself of his improvement in the Pump.

---

The following is a description of the Pump used for pumping water, & the improvements claimed thereon, viz.

The principal parts consist of a perpendicular tube in the form of the upper part of a pump, with its flange, bottom plate, valve, moveable box, rod, lever, screws & bolt. This pump is made of cast iron, wrought iron or other metal. The body of this pump now used, is about two feet in length; the caliber is from two to three inches according to the quantity of water required; at the bottom of the caliber is a projection or flange extending about eight inches in diameter; under the flange is a plate about twelve inches in diameter, of suitable thickness for the strength required. Through the centre of said plate is a hole about an inch and a quarter to an inch and a half diameter, on the upper side of the hole is an elevation about an eighth of an inch in height, and a little more than an eighth of an inch in width, in a circular form corresponding with the hole, on which the lower valve shuts. Near the circumference of the plate are a sufficient number of holes for wood screws or bolts, that said plate may be attached to any board or plank in whatever place said pump may be used. The thickness of the pump from the caliber to the surface is a little more than a quarter of an inch. The flange of the perpendicular tube is put together by screws centrally over the lower valve, & is made tight by placing a circular piece of thin leather, or any other suitable material between the bottom plate and flange. The lower valve is attached to the lower plate, by copper screws

[illegible]

6687X or rivets, so that the body of the pump may be taken off, to come at the lower valve without disturbing the lower plate or pipe. The plate is connected with the pipe by means of a collar with a suitable hole through it to receive the end of the pipe. The upper end of said pipe being turned outwardly & bent over in the form of a flange & is made tight by being firmly screwed to the bottom plate, having also a circular piece of leather placed on the top of said flange in the same manner as between the plate & the flange at the bottom of the pump. The moveable box is about three inches long and turned to the size of the caliber of the body of the pump. A groove is turned in the middle part of said box for the purpose of winding rope yarn or leather, so that said box may be kept tight. On the upper side of said box a valve is placed & fastened in the same manner as the lower valve on the bottom plate. A staple is attached to said box with a joint about two or three inches above said valve, and is connected to the lever by a rod: this joint is to prevent the friction otherwise occasioned by the circular motion of said lever. The lever is attached to said pump in the common form. A brass thumb screw is inserted in the lower part of said pump, a little above the flange, by being turned, the inner end raises the valve so as to let the water off, to prevent it from frost. The cast iron tube or pipe, is made from two to five feet in length, as may be found most convenient, with a suitable caliber, being larger at one end than the other, so that they may be put together similar to the funnel of a stove. These tubes are made fast together by two loops or ears opposite .. each other. The loop on the large end of the pipe is even with the end; and those on the small end of the pipe are about one inch from the end, which will admit of entering one inch. These loops are about three quarters of an inch in width, of suitable thickness for strength, and when put together are secured by a link in the form of a chain and made tight by packing. The loops & links may be multiplied as may be required.

Improvements claimed, unless the same have been used without the knowledge of your petitioner; viz: The bottom plate in a horizontal manner with a valve attached to it and playing upon said elevations; and the manner of connecting it with the plate as set forth in the above specification.

The joint connecting the upper box with the rod, & the screw for letting off water in the manner above described, by which the pump is made much easier, & at a less expense. And the manner of putting together the tube & fastening the same, which is a substitute for the lead pipe.

Witnesses.
Welcome Young.
Josiah Reed.

Jesse Reed.

(952 words)